2,801,075

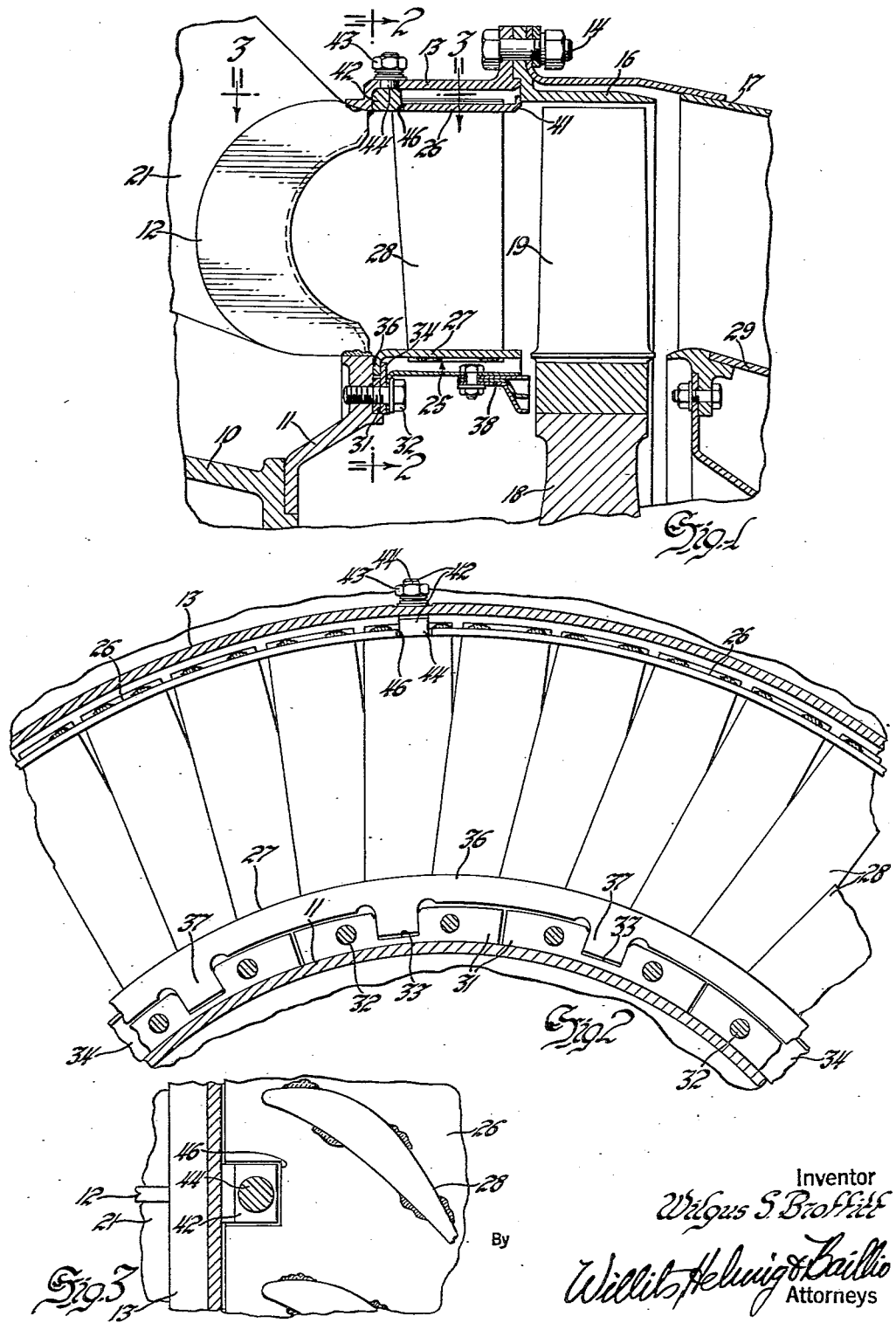

TURBINE NOZZLE

Wilgus S. Broffitt, Indianapolis, Ind., assignor to General Motors Corporation, Detroit, Mich., a corporation of Delaware Application December 22, 1952, Serial No. 327,352

3 Claims. (Cl. 253—78)

My invention relates to turbine nozzles and the like and, more particularly, to a turbine nozzle structure particularly adapted to gas turbine installations. It will be understood, however, that the principles of the invention may be applied to analogous installations. It will also be understood that within the term "nozzle" may be embraced not only the first stage nozzle but intermediate stage nozzles or diaphragms of multistage turbines.

The principal object of the invention is to provide a structure of this sort better to withstand the extremely rigorous conditions of aircraft gas turbine service than nozzle arrangements previously known. In this connection, it is well known that the temperatures employed in such engines are extremely high and are highest at the turbine nozzle. It is also known that the engines are quickly started and stopped and sometimes are subject to flame-outs and to over-temperature conditions in service, all of which give rise to rapid temperature changes and high stresses due to expansion of the hot parts of the nozzle.

A turbine nozzle for an axial flow turbine ordinarily comprises an outer shroud ring and an inner shroud ring, these defining the boundaries of the motive fluid path, and a large number of vanes extending generally radially between the shroud rings. It has been found impracticable to make this entire assembly a single rigid lattice with continuous inner and outer shroud rings and vanes fixed at both ends to both shroud rings, because stresses occasioned by thermal expansions and accompanied by gas loading have resulted in distortion and destruction of nozzle structures.

The conventional approach to this problem has been to form one or both of the shroud rings as a plurality of segments to provide expansion gaps in the shroud rings.

In principle, my invention involves employing continuous shroud rings and providing a loose connection between the vanes and at least one of the shroud rings. It also involves provision for radial expansion of the shroud rings with respect to other parts of the turbine on which they are mounted where such provision is desirable, as normally it may be expected to be.

This invention is related to that disclosed and claimed in my copending application for "Turbine Nozzle," Serial No. 327,353, filed December 22, 1952.

The principles of the invention and the advantages thereof will be more clearly apparent to those skilled in the art from the succeeding detailed description and the accompanying drawings, in which:

Fig. 1 is a fragmentary sectional view of a gas turbine engine of one type incorporating the nozzle structure of the invention, the section being taken on a plane containing the axis of the turbine;

Fig. 2 is a partial elevational view of the nozzle projected on the plane indicated in Fig. 1; and Fig. 3 is a partial plan view of the nozzle projected on the plane indicated in Fig. 1.

The invention is illustrated herein as applied to a known engine (a turbojet engine of the J33 series), which engine is shown only sufficiently to make clear the structure pertinent to the invention. Since the general structure and operation of the engine are widely known and understood, the view of Fig. 1 shows principally the turbine nozzle, the rim of the turbine wheel including the blades, and the structure defining the motive fluid path adjacent the turbine, which is of the single stage type.

Referring first to Fig. 1, the frame member 10, which is the principal structural member of the engine interconnecting the turbine and compressor and supporting the main shaft of the engine, has fixed thereon a support ring 11 joined by a number of radially extending gusset plates 12 to a turbine nozzle casing 13. The gussets 12 are welded to the ring 11 and casing 13 and thus the members 11 and 12 define a support for the casing from the engine frame 10. Fixed on the turbine nozzle casing 13 by bolts 14 are a turbine shroud 16 and an outer wall 17 of the exhaust duct. A turbine wheel 18 on which are mounted blades 19 rotates within the shroud 16. Motive fluid is delivered to the turbine by a number of combustion chambers 21, only the discharge ends of which are illustrated, which are mounted between the ring 11 and casing 13 and extend circumferentially between the gusset plates 12. The motive fluid discharged from the combustion chambers flows directly to a full-admission turbine nozzle indicated generally as 25 and comprising an outer shroud ring 26, an inner shroud ring 27, and nozzle vanes or blades 28 extending generally radially between the shroud rings. The vanes 28 direct motive fluid to the turbine buckets 19 from which it is exhausted into the exhaust duct defined by the wall 17 and an inner duct wall or tailcone 29.

The inner shroud ring 27 is mounted on the support ring 11 by means which provide for relative radial expansion of these parts but prevent any axial or rotational movement of the shroud ring and which center the shroud ring with respect to the turbine axis.

Referring also to Fig. 2, the inner shroud 27 is mounted on the support 11 by means providing radial tongue and slot connections for relative expansion of these members. In the preferred form of this connection, a number of clips 31 of heavy gauge sheet metal are mounted on the support 11 by cap screws 32. Each clip 31 is somewhat U-shaped as will be apparent from Fig. 2, and defines a slot 33 between two of the bolts 32. A sheet metal ring 34, which may be a continuous ring or be segmented, is held in place by the screws 32 immediately behind the clips 31. The shroud ring 27 is formed with an inwardly directed flange 36 at its forward or leading edge, this flange being extended to provide a number of projections or tongues 37 which extend into the slots 33 and between the rear face of the ring 11 and the forward face of the ring 34. It will be understood that the clips 31 are slightly thicker than the flange 36 and tongues 37 and, likewise, the slots 33 are very slightly wider than the tongues 37, so that the tongues may slide radially in the slots. It will be apparent that the shroud ring is thus centered and is held against rotation or movement axially of the turbine, but is free to expand radially.

A labyrinth seal ring structure 38, which coacts with the forward face of the turbine wheel 18, is held on the support 11 by the bolts 32 which also retain the parts 31 and 34 already described.

The vanes 28 are passed through openings in the inner shroud shaped to fit the vanes and extend slightly through the ring, as will be apparent from Fig. 1. The vanes likewise extend through holes formed to fit the vanes in the outer shroud ring 26 but are welded, as will be most clearly apparent from Fig. 3, at the outer surface of the shroud ring 26 so that the vanes are not displaceable radially with respect to the outer shroud.

The outer shroud ring 26 is generally cylindrical but is formed with an outwardly directed flange 41 on its downstream edge which engages the forward face of the turbine shroud ring 16, the abutment of these parts preventing axial displacement of the shroud ring 26 by the gas pressures exerted on the nozzle. Since the abutting surfaces are radial, relative radial expansion of the two parts is permitted.

The outer shroud ring is centered radially of the turbine and held against rotation, in addition to the support it receives by the engagement by the vanes 28 in the inner shroud ring, by a number of keys 42 mounted in the turbine case 13. The number of keys is not critical, but in this case it is preferred that eight be installed. Each of these keys fits against a radial flange of the casing and it held against the outer wall by a nut 43 engaging a stud 44 integral with the key 42. The shroud ring 26 is formed with slots 46 which fit around the keys 42 with slight clearance, thus providing for freedom of movement radially of the turbine but only very slight freedom for movement circumferentially.

It will be apparent from the foregoing that the structure described is particularly adapted for endurance of thermal shock and high temperature operating conditions and for production. The turbine casing 13 and the gussets 12 and support ring 11, which are the equivalent of structures previously used in engines of this type, are not directly exposed to the hot gas and may be cooled by air which circulates over the engine. These constitute a part of the structural frame of the engine as a whole by which the turbine case and exhaust duct are mounted onto the engine frame 10.

The turbine nozzle 25 is so mounted as not to be subjected to loading by stresses put on the engine itself but only by the force of the gases which pass through the nozzle. The nozzle itself, of course, becomes very hot in service but is so mounted that the parts are free to expand with respect to the very much cooler turbine case and support ring. More explicitly, the inner shroud 27 may expand radially with respect to support 11. The outer shroud 26 may expand radially with respect to the casing 13. The outer and inner shroud rings may expand relatively to each other without difficulty, because the vanes 28 may slide radially in the inner shroud. The two shroud rings and thereby the vanes are held against displacement axially of the engine and rotation about the axis.

The ring 11 constitutes an annular inner support for the nozzle 25. The casing 13 is an annular outer casing for the turbine and is an annular outer support for the nozzle 25.

The invention is not to be regarded as limited in any way by the detailed description herein of the preferred embodiment thereof for the purpose of explaining the invention. It will be apparent that many modifications may be made by the exercise of skill in the art within the scope of the principles of the invention.

I claim:

1. A full-admission turbine nozzle comprising an annular outer casing, an annular inner support, means extending from the casing to the support maintaining the casing and support relatively fixed in coaxial relation, a continuous integral endless inner nozzle shroud ring, relatively radially slidable means on the inner shroud ring and the support mounting the inner shroud ring on the support with freedom for radial expansion of the shroud ring, a continuous integral endless outer nozzle shroud ring disposed within and adjacent to the casing, the shroud rings defining the inner and outer boundaries, respectively, of the motive fluid path through the nozzle, relatively radially slidable means keying the outer shroud ring to the casing with freedom for radial expansion of the shroud ring to prevent rotation of the outer shroud ring about its axis, interengaging means on the casing and outer shroud ring providing a radially slidable abutment to restrain the outer shroud ring against axial displacement by gas loading, and nozzle vanes extending generally radially from one shroud ring to the other, the vanes extending through vane-shaped openings in the shroud rings, the vanes being fixed to one shroud ring and being radially slidably mounted in the other shroud ring.

2. A full-admission turbine nozzle comprising an annular outer casing, an annular inner support, means extending from the casing to the support maintaining the casing and support relatively fixed in coaxial relation, a continuous integral endless inner nozzle shroud ring, relatively radially slidable interengaging means on the inner shroud ring and the support mounting the inner shroud ring on the support with freedom for radial expansion of the shroud ring, a continuous integral endless outer nozzle shroud ring disposed within and adjacent to the casing, the shroud rings defining the inner and outer boundaries, respectively, of the motive fluid path through the nozzle, relatively radially slidable interengaging means on the casing and outer shroud ring providing an abutment to restrain the outer shroud ring against axial displacement by gas loading, one of said interengaging means including abutments restraining the shroud ring against rotation around its axis and nozzle vanes extending generally radially from one shroud ring to the other, the vanes being fixed to one shroud ring and extending slidably through vane-shaped openings in the other shroud ring so as to provide for radial expansion.

3. A turbine nozzle comprising a first annular support, a second annular support, a first continuous integral endless shroud ring, a second continuous integral endless shroud ring, the shroud rings defining the inner and outer boundaries, respectively, of the motive fluid path through the nozzle, relatively radially slidable interengaging means on the first shroud means and the first support mounting the first shroud ring on the first support with freedom for radial expansion of the ring, relatively radially slidable interengaging means on the second shroud ring and the second support mounting the second shroud ring on the second support with freedom for radial expansion of the ring, one said mounting means including means restraining one said ring against rotation around its axis and against displacement along its axis, and nozzle vanes extending from one ring to the other, the vanes being mounted in vane-shaped openings in both rings and being slidable radially in at least one ring.

References Cited in the file of this patent

UNITED STATES PATENTS

| | | |
|---|---|---|
| 2,427,244 | Warner | Sept. 9, 1947 |
| 2,447,942 | Imbert et al. | Aug. 24, 1948 |
| 2,479,573 | Howard | Aug. 23, 1949 |
| 2,606,741 | Howard | Aug. 12, 1952 |
| 2,625,367 | Rainbow et al. | Jan. 13, 1953 |
| 2,643,086 | Thomas et al. | June 23, 1953 |
| 2,654,566 | Boyd | Oct. 6, 1953 |